US009247003B2

(12) United States Patent
Bell, Jr. et al.

(10) Patent No.: US 9,247,003 B2
(45) Date of Patent: *Jan. 26, 2016

(54) DETERMINING SERVER WRITE ACTIVITY LEVELS TO USE TO ADJUST WRITE CACHE SIZE

(71) Applicant: International Business Machines Corporation, Armonk, NY (US)

(72) Inventors: Robert H. Bell, Jr., Austin, TX (US); Michael D. Roll, Tucson, AZ (US); Olga Yiparaki, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/606,983

(22) Filed: Jan. 27, 2015

(65) Prior Publication Data

US 2015/0142907 A1 May 21, 2015

Related U.S. Application Data

(63) Continuation of application No. 13/478,868, filed on May 23, 2012, now Pat. No. 9,065,840, which is a continuation of application No. 12/965,517, filed on Dec. 10, 2010, now Pat. No. 9,009,406.

(51) Int. Cl.
*G06F 12/00* (2006.01)
*H04L 29/08* (2006.01)
*G06F 11/34* (2006.01)

(52) U.S. Cl.
CPC ........ *H04L 67/1097* (2013.01); *G06F 11/3409* (2013.01); *G06F 11/3442* (2013.01);

(Continued)

(58) Field of Classification Search
CPC . H04L 67/1097; H04L 67/34; G06F 11/3485; G06F 11/3409; G06F 11/3442
USPC .......................................... 711/118, 154, 170
See application file for complete search history.

(56) References Cited

U.S. PATENT DOCUMENTS 5,045,998 A 9/1991 Begun et al.
6,098,096 A 8/2000 Tsirigotis et al.

(Continued)

OTHER PUBLICATIONS

B. Mohammad, et al., "Dynamic Cache Resizing Architecture for High Yield SOC", [online], URL: http://users.ece.utexas.edu/~suleman/papers/resize_cache.pdf, 2009 IEEE International Conference on IC Design & Technology (ICICDT), Austin, TX, USA May 18-20, 2009.

(Continued)

*Primary Examiner* — Matthew Bradley
(74) *Attorney, Agent, or Firm* — David W. Victor; Konrad Raynes Davda & Victor LLP

(57) ABSTRACT

Provided are a computer program product, system, and method for determining server write activity levels to use to adjust write cache size. Server write activity information on server write activity to the cache is gathered. The server write activity information is processed to determine a server write activity level comprising one of multiple write activity levels indicating a level of write activity. The determined server write activity level is transmitted to a storage server having a write cache, wherein the storage server uses the determined server write activity level to determine whether to adjust a size of the storage server write cache.

20 Claims, 8 Drawing Sheets

(52) U.S. Cl.
CPC ........ *G06F11/3485* (2013.01); *H04L 67/2847* (2013.01); *H04L 67/2852* (2013.01); *H04L 67/34* (2013.01); *G06F 2201/81* (2013.01); *G06F 2201/88* (2013.01); *G06F 2201/885* (2013.01); *Y02B 60/165* (2013.01)

(56) References Cited

U.S. PATENT DOCUMENTS

| | | | |
|---|---|---|---|
| 7,089,347 | B2 | 8/2006 | Mogi et al. |
| 7,127,560 | B2 | 10/2006 | Cohen et al. |
| 7,437,510 | B2 | 10/2008 | Rosenbluth et al. |
| 8,504,774 | B2 | 8/2013 | Khawand et al. |
| 2004/0054851 | A1 | 3/2004 | Acton et al. |
| 2007/0028053 | A1 | 2/2007 | Shet et al. |
| 2007/0296729 | A1 | 12/2007 | Du et al. |
| 2009/0204768 | A1 | 8/2009 | Bruening et al. |
| 2010/0017542 | A1 | 1/2010 | Merry, Jr. et al. |
| 2010/0049920 | A1 | 2/2010 | LaFrese et al. |
| 2012/0151141 | A1 | 6/2012 | Bell, Jr. et al. |
| 2012/0233283 | A1 | 9/2012 | Bell, Jr. et al. |

OTHER PUBLICATIONS

"Sun StorEdge 9910 and 9960 Systems", Sun Microsystems, [online], URL: http://www.hte.com.cy/computer/pdf/9900_datasheet.pdf, copyright 2002.

Abella, J., et al., "Heterogeneous Way-Size Cache", Proceedings of the 20th Annual International Conference on Supercomputing, 2006, 10 pp.

Soman, S., et al., "Dynamic Selection of Application-Specific Garbage Collectors", Proceedings of the 4th International Symposium on Memory Management, 2004, 12 pp.

Venkatachalam, V., et al., "Power Reduction Techniques for Microprocessor Systems", ACM Computing Surveys, vol. 37, No. 3, Sep. 2005, 43 pp.

Preliminary Amendment filed May 23, 2012, pp. 1-9, for U.S. Appl. No. 12/965,517, filed Dec. 10, 2012, entitled "Determining Server Write Activity Levels to Use to Adjust Write Cache Size", by inventors R.H. Bell, Jr., M.D. Roll, and O. Yiparaki.

Office Action dated Dec. 23, 2013, pp. 11, for U.S. Appl. No. 12/965,517, filed Dec. 10, 2012.

Response dated Mar. 24, 2014, p. 10, to Office Action dated Dec. 23, 2013, pp. 11, for U.S. Appl. No. 12/965,517, filed Dec. 10, 2012.

Notice of Allowance dated Nov. 14, 2014, pp. 33, U.S. Appl. No. 12/965,517, filed Dec. 10, 2012.

Preliminary Amendment filed May 23, 2012, pp. 1-15, U.S. Appl. No. 13/478,868, filed Dec. 10, 2012.

Office Action dated Jan. 17, 2014, pp. 7, for U.S. Appl. No. 13/478,868, filed Dec. 10, 2012.

Response dated Apr. 17, 2014, pp. 10, to Office Action dated Jan. 17, 2014, pp. 7, for U.S. Appl. No. 13/478,868, filed Dec. 10, 2012.

Notice of Allowance dated Jun. 23, 2014, pp. 9, for U.S. Appl. No. 13/478,868, filed Dec. 10, 2012.

Office Action dated Oct. 6, 2014, pp. 16, for U.S. Appl. No. 13/478,868, filed Dec. 10, 2012.

Response dated Jan. 6, 2015, pp. 6, to Office Action dated Oct. 6, 2014, pp. 16, for U.S. Appl. No. 13/478,868, filed Dec. 10, 2012.

Amendment dated Sep. 22, 2014, pp. 5, for U.S. Appl. No. 13/478,868, filed Dec. 10, 2012.

Notice of Allowance dated Feb. 13, 2015, pp. 9, for U.S. Appl. No. 13/478,868, filed Dec. 10, 2012.

Server Write Activity Information

Page Write Activity Information

| CSPT Hints and Categorizations | | Prefetch Engine | Performance/ Monitor Logic | TLB Entries | |
|---|---|---|---|---|---|
| Last Write Activity Hint to Storage | Page Write Activity Category | PrefetchWrite Streams associated with a page | Page Write Counts (from TLB or PMU) | Page Access Counts (MRU counts) | Other TLB info |
| High Write Activity | Low Activity | 0 | 452303 | 3092077009 | ... |
| | High Activity | 4 | 1945345674 | 2343456898 | ... |
| | High Activity | 10 | 216788870 | 1321276455 | ... |
| | Medium Activity | 2 | 882003002 | 1062171231 | ... |

FIG. 5

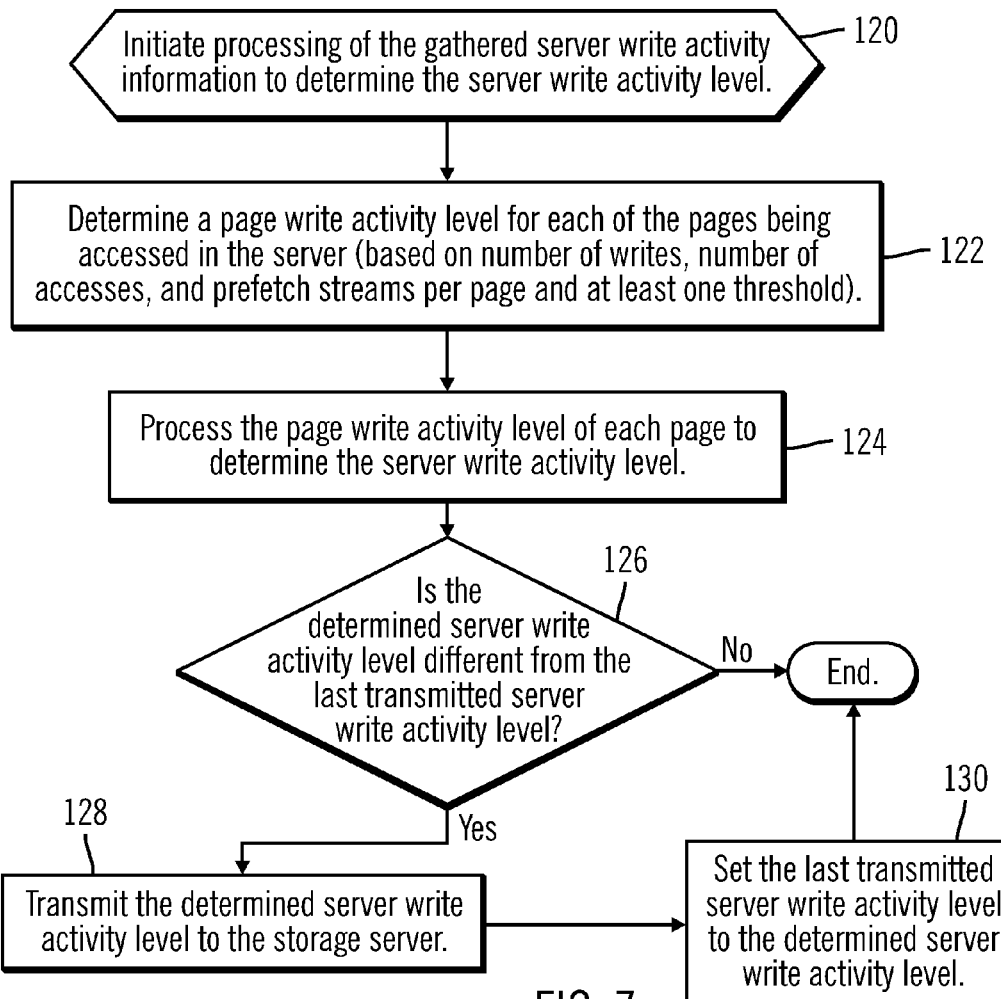

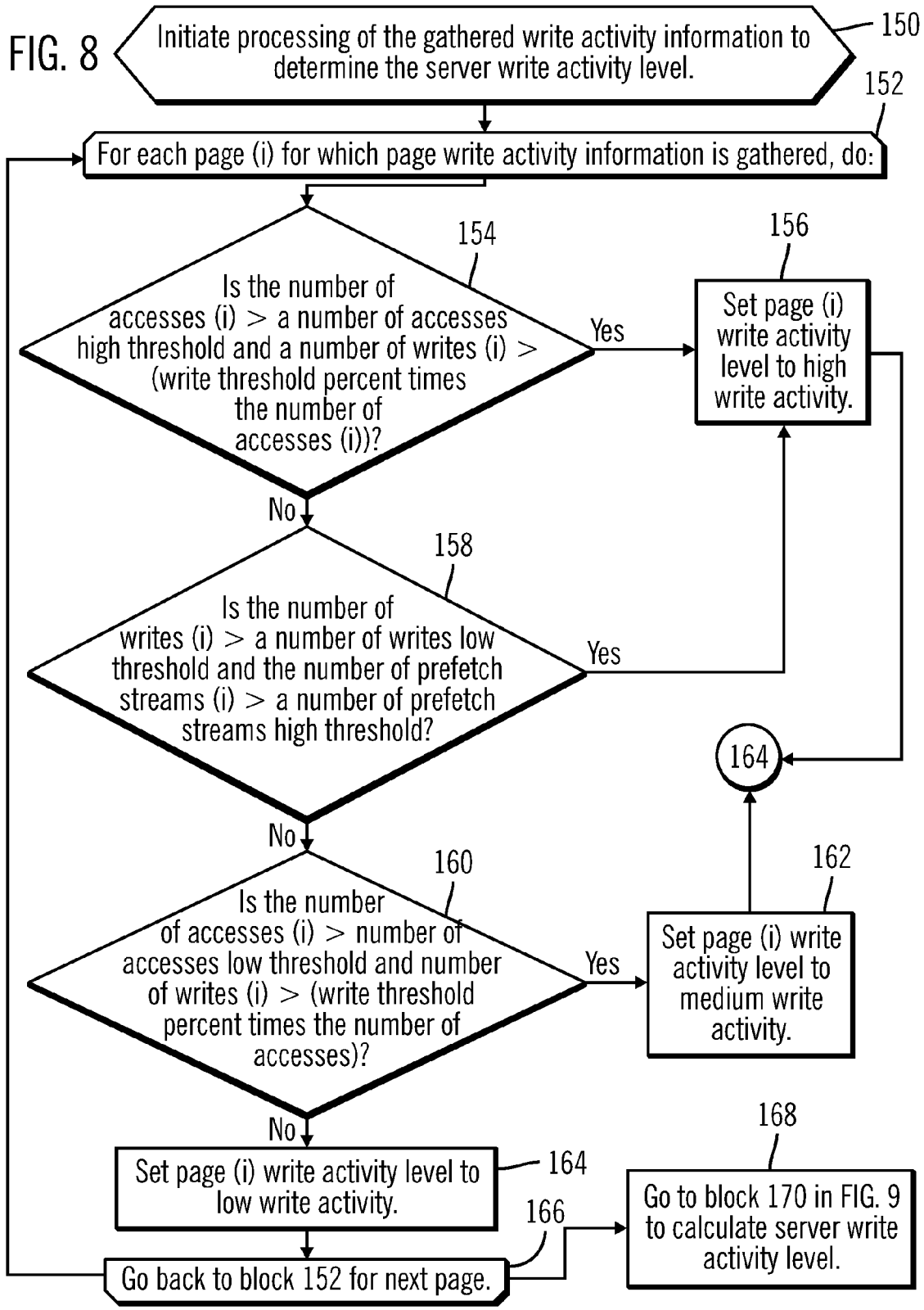

DETERMINING SERVER WRITE ACTIVITY LEVELS TO USE TO ADJUST WRITE CACHE SIZE

CROSS-REFERENCE TO RELATED APPLICATION

This application is a continuation of U.S. patent application Ser. No. 13/478,868, filed May 23, 2012, which is a continuation of U.S. patent application Ser. No. 12/965,517, filed Dec. 10, 2010, which patent applications are incorporated herein by reference in their entirety.

BACKGROUND OF THE INVENTION

1. Field of the Invention

The present invention relates to a computer program product, system, and method for determining server write activity levels to use to adjust write cache size.

2. Description of the Related Art

Enterprise storage servers provide storage for multiple connected servers or hosts. Enterprise storage includes a write cache to cache writes from the connected servers to improve write performance. Complete is returned to the servers in response to writing the data to the write-cache and the data written to the write cache is subsequently asynchronously destaged to storage. The host is provided complete before the data is destaged to storage to avoid delays to host processing. For write-caching to be most effective, it is important that data be destaged quickly enough so the write-cache does not become full. In case the cache becomes full, new server or host writes are delayed until space in the write-cache is made available by destaging data to storage. Such delays can take a long time to resolve—perhaps 100 ms or longer—because of the protocol to start and stop the sending of stores, the time lag to physically send signals and data between host and storage, and the delay in activity caused by doing so. Such delays are several orders of magnitude higher than the usual 1 ms time to complete a store when the storage is not delaying host writes.

Server performance suffers if there are continual write delays due to a full write cache. Further, the server energy expenditure and resulting cost to execute the job can increase when the server must wait for milliseconds before sending further writes. Therefore, performance is improved, energy is decreased, and cost is lowered when the write-cache is large enough such that the storage server does not have to delay returning complete to server writes.

On the other hand, when the write-cache is too large, more power than necessary is expended to maintain the large write cache, which must be duplicated into non-volatile storage in a highly-reliable storage systems, essentially doubling the energy expenditure of the write-cache. When there is no need for a large write-cache, parts of the non-volatile write-cache could be clock-gated or powered-down, thereby reducing energy costs.

There is a need in the art for improved techniques for managing the write cache.

SUMMARY

Provided are a computer program product, system, and method for determining server write activity levels to use to adjust write cache size. Information on server write activity to the cache is gathered. The gathered information on write activity is processed to determine a server write activity level comprising one of multiple write activity levels indicating a level of write activity. The determined server write activity level is transmitted to a storage server having a write cache, wherein the storage server uses the determined server write activity level to determine whether to adjust a size of the storage server write cache.

Further, provided are a computer program product, system, and method for adjusting write cache for a storage server in communication with a plurality of servers. Server write activity levels are received from servers comprising one of multiple write activity levels indicating levels of write activity at the servers. The server write activity levels of the servers are processed to determine whether to adjust a size of the write cache for receiving writes from the servers. The size of the write cache is adjusted in response to determining to adjust the size of the write cache.

BRIEF DESCRIPTION OF THE DRAWINGS

FIG. 5 illustrates an example of gathered server write activity information.

FIG. 6 illustrates an embodiment of operations for servers to gather write activity information.

FIGS. 7, 8, and 9 illustrate embodiments of operations for servers to determine the server write activity level.

DETAILED DESCRIPTION

Figure 1:
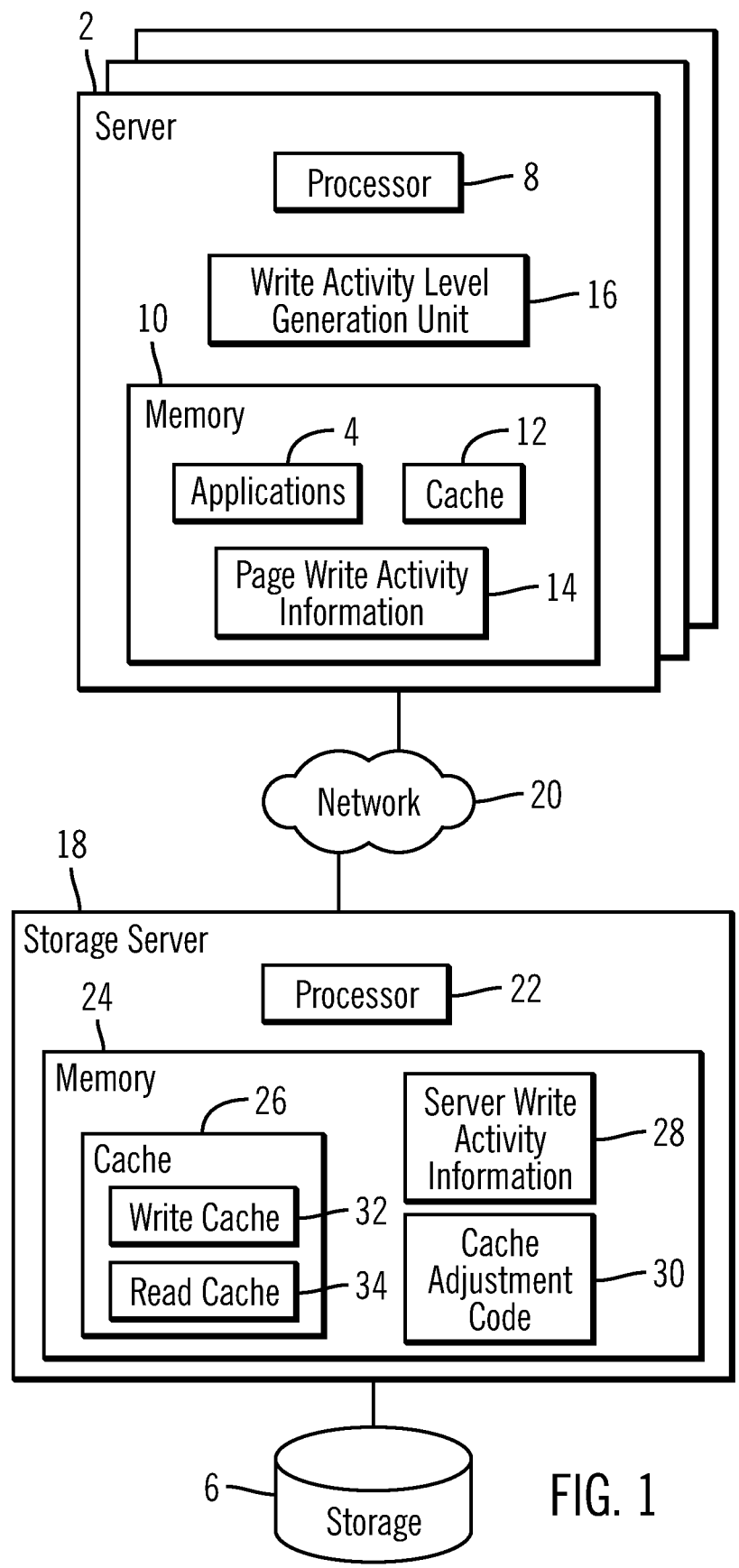
FIG. 1 illustrates an embodiment of a storage computing environment.

FIG. 1 illustrates an embodiment of a storage computing environment. Servers 2 manage Input/Output (I/O) requests from applications 4 in the server 2 or from external systems directed to a storage system 6. Each server 2 has a processor 8 and a memory 10 including the applications 4 and a cache 12 to cache application writes and page write activity information 14. The server 2 includes a write activity level generation unit 16 that monitors write activity to pages having addresses in the storage 6 in the cache 14 and gathers page information on the write activity to use to determine a server write activity level comprising one of multiple levels, e.g., low, medium, and high.

The servers 2 are in communication with a storage server 18 over a network 20. The storage server 18 manages I/O requests from servers 2 directed to the storage 6. The storage server 18 includes a processor 22 and a memory 24 including a cache 26 to cache reads and writes from the servers 2 directed to the storage 6, server write activity information 28 including server write activity levels sent from the servers 2, and cache adjustment code 30 to process the gathered server write activity information 28 to determine whether to adjust a write cache 32 of the cache 26. Adjusting the write cache 32 affects the size of the read cache 34 available for read request data to return to the servers 2.

The processors 8 and 22 may comprise one or more processing units or complexes. The memories 10 and 24 may comprise one or more volatile or non-volatile memory devices. Further, the write cache 32 may be implemented in a non-volatile storage unit (NVS) or may have a backup NVS for failure recovery. The network 20 may comprise a Storage Area Network (SAN), Local Area Network (LAN), Intranet, the Internet, Wide Area Network (WAN), peer-to-peer network, wireless network, arbitrated loop network, etc. The servers 2 and 18 may comprise an enterprise storage server, storage controller, blade server, general purpose server, desktop computer, workstation, telephony device, personal digital assistant (PDA), etc., or other device used to manage I/O requests to attached storage systems 6a, 6b, 6c. The storage 6 may comprise storage media implemented in one or more storage devices known in the art, such as interconnected hard disk drives (e.g., configured as a DASD, RAID, JBOD, etc.), magnetic tape, solid state storage devices (e.g., EEPROM (Electrically Erasable Programmable Read-Only Memory), flash memory, flash disk, storage-class memory (SCM)), electronic memory, etc.

The write activity level generation unit 16 in the servers 2 may be implemented in a code module comprising a software program in the memory 10 that is executed by the processor 8. The code module including the write activity level generation unit 16 may alternatively comprise firmware or modules within the processor 8 hardware or within a hardware component in the server 2 external to the processor 8. The cache adjustment code 30 in the storage server 18 may be implemented in a code module comprising software in the memory 24 that is executed by the processor 22. The code module including the cache adjustment code 30 may also be implemented in firmware or modules within the processor 8 hardware or within a hardware component in the server 2 external to the processor 8.

Figure 2:
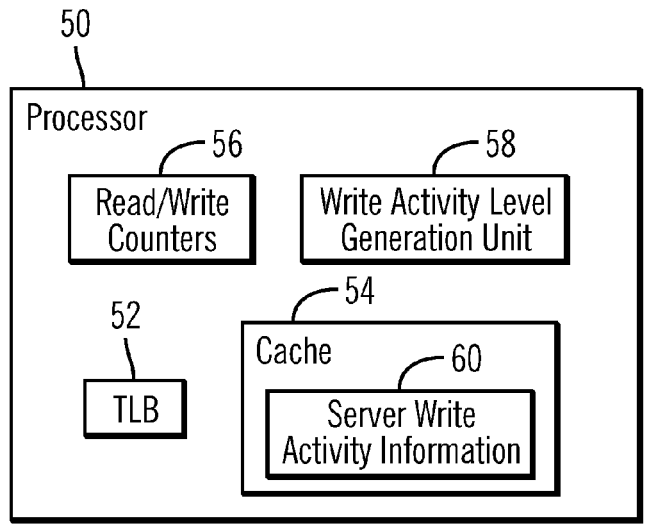
FIG. 2 illustrates an embodiment of a processor in the storage server.

FIG. 2 illustrates an embodiment of a server processor 50, such as processor 8, in which the write activity level generation unit 16 is implemented in the processor 50 hardware logic. The processor 50 includes a translation look-aside buffer (TLB) 52, which is a cache that contains parts of the page table used to translate virtual addresses into real addresses in the storage 6, a cache 54, read/write counters 56 indicating a number of reads and writes to pages in the memory 10, and a write activity level generation unit 58 to determine the page write activity level for pages in the memory 10 and a server write activity level based on the page write activity levels. The TLB 52 may further maintain a number of prefetch streams prefetching pages in the memory 10. The write activity level generation unit 58, providing an implementation of the write activity level generation unit 16, gathers server write activity information 60 based on write activity to pages in the server 2 that is used to determine page write activity levels and an overall server write activity level.

Figure 3:
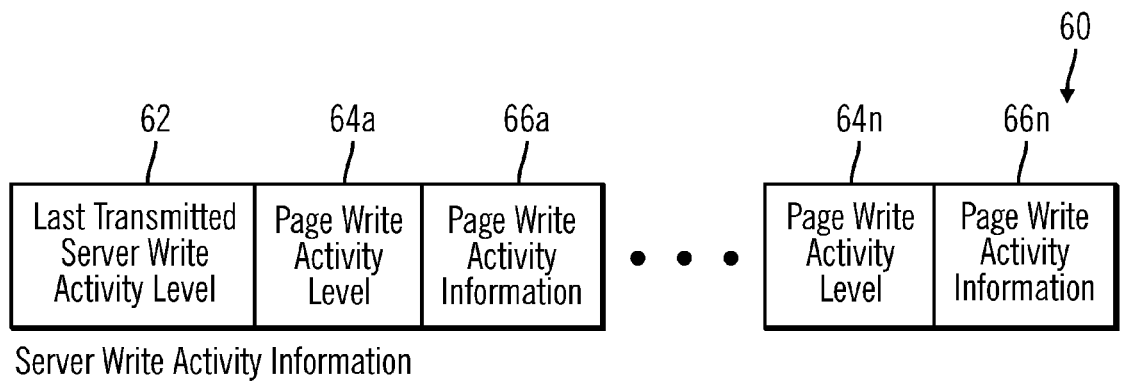
FIG. 3 illustrates an embodiment of server write activity information.

FIG. 3 illustrates an embodiment of server write activity information 60, such as server write activity information 60 in FIG. 2 or server write activity information 28 in FIG. 1, as including a last transmitted server write activity level 62 of the last server write activity level calculated and transmitted to the storage server 18 and page information for each page of addresses in the storage 6 being accessed at the server 2, including for each page, a calculated page write activity level 64a . . . 64n and page write activity information 66a . . . 66n.

Figure 4:
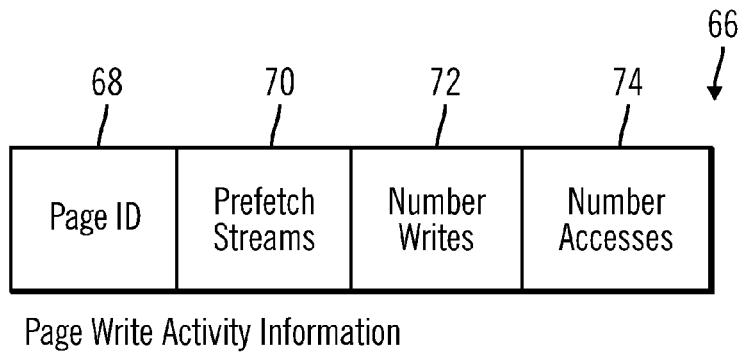
FIG. 4 illustrates an embodiment of page write activity information.

FIG. 4 illustrates an embodiment of page write activity information 66, such as the page write activity information 66a . . . 66n in FIG. 3, for each page. The page write activity information 66 may include a page identifier (ID) 68, a number of prefetch streams 70 actively directed to the page 68, a number of writes 72 directed to the page 68, and a number of accesses 74 (both reads and writes) directed to the page 68.

FIG. 5 illustrates an example of the server write activity information 80 having information on four pages in rows 82a, 82b, 82c, 82d providing page write activity 84 level, prefetch write streams for a page 86, page writes 88, and page accesses 90 (reads and writes).

FIG. 6 illustrates an embodiment of operations performed by the write activity level generation unit 16 or 58 in the server 2 to gather write activity information 60 (FIG. 3). Upon initiating (at block 100) gathering of write activity information, the write activity level generation unit 16 or 58 gathers (at block 102), for a time period, for each page being accessed, a number of prefetch streams 70, number of writes 72, and number of accesses 74. Previously gathered information, including the previously determined page write activity levels 64a . . . 64n and page write activity information 66a . . . 66n, may be cleared before gathering information for the current time period, except for the last transmitted server write activity level 62 (FIG. 3).

FIG. 7 illustrates an embodiment of operations performed by the write activity level generation unit 16 or 58 in the server 2 to determine the server write activity level for the server 2. Upon initiating (at block 120) processing of the gathered server write activity information to determine the server write activity level, the write activity level generation unit 16 or 58 determines (at block 122) a page write activity level 66a . . . 66n for each of the pages being accessed in the server 2 (such as based on number of writes 72, the number of accesses 74, and the prefetch streams per page 70 and at least one threshold). The write activity level generation unit 16 or 58 processes (at block 124) the page write activity level 64a . . . 64n of each page to determine the server write activity level. If (at block 126) the determined server write activity level is different from the last transmitted server write activity level 62 (FIG. 3), then the write activity level generation unit 16 or 58 transmits (at block 128) the determined server write activity level to the storage server 18 and then sets (at block 130) the last transmitted server write activity level 62 in the server write activity information 60 (FIG. 3) to the determined sever write activity level. If (at block 126) the determined server write activity level is unchanged since the last calculation, then control ends and the unchanged information is not sent to the storage server 18. If the storage server 18 does not receive a server write activity level from one of the servers 2, then the storage server 18 would use the previously transmitted server write activity level for that server 2.

Figure 9:
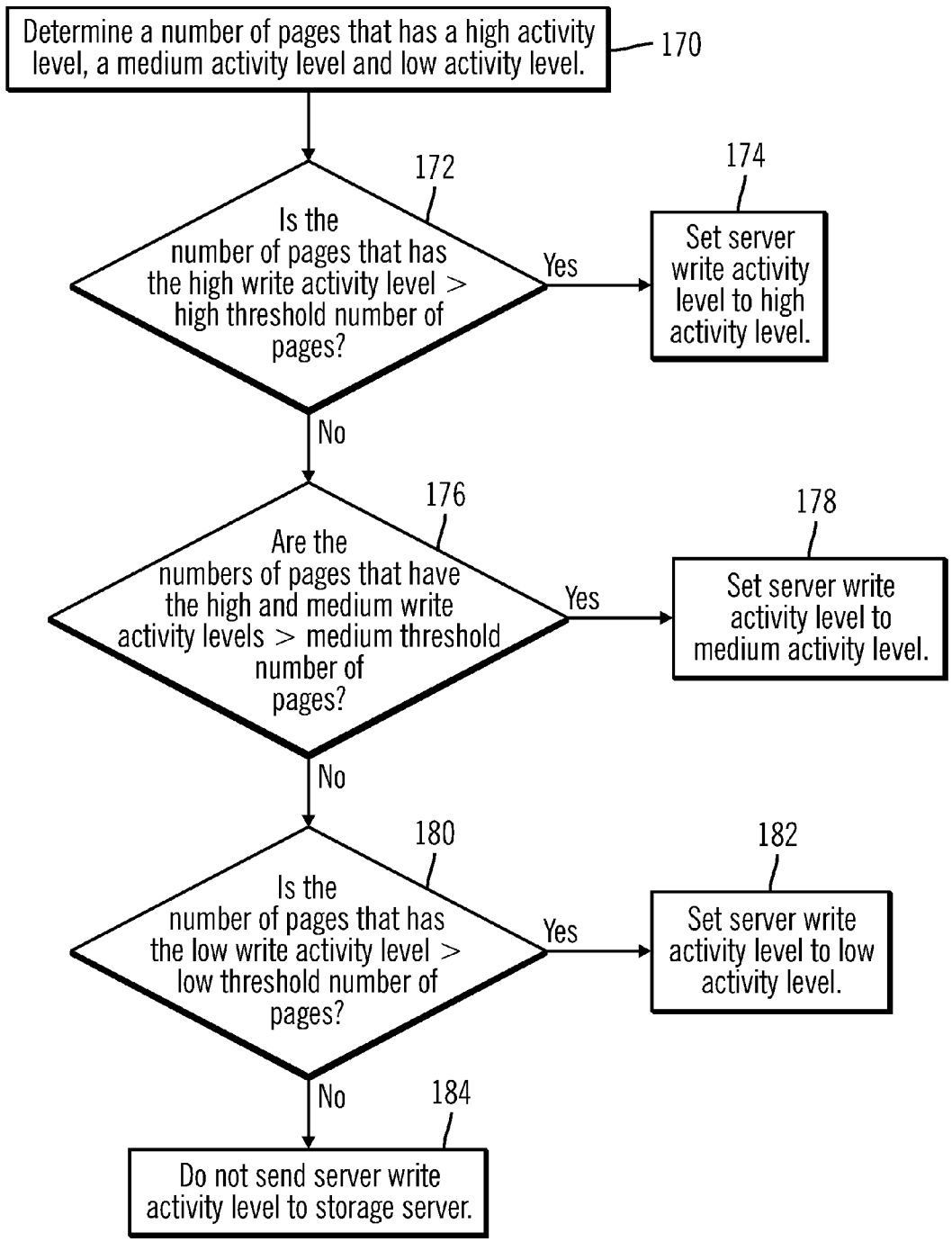

FIGS. 8 and 9 illustrate a further embodiment of operations performed by the write activity level generation unit 16 or 58 in one of the servers 2 to determine the server write activity level for the server 2. Upon initiating (at block 150) processing of the gathered server write activity information to determine the server write activity level, the write activity level generation unit 16 or 58 performs a loop at blocks 152 through 166 of operations at blocks 154 through 164 for each page, for which page write activity information 66a . . . 66n is gathered, to determine the page write activity level 64a . . . 64n for each page. For page (i), if (at block 154) the number of accesses (i) 74, for page (i), is greater than a number of accesses high threshold and a number of writes (i) 72, for page (i), is greater than a write threshold percent times the number of accesses (i), for page (i), then the write activity level generation unit 16 sets (at block 156) the page (i) write activity level 64a . . . 64n to high write activity. If the conditions of block 154 to check for a high level of activity, are not met, then the write activity level generation unit 16 determines whether (at block 158) the number of writes (i), for page (i), 72 is greater than a number of writes low threshold and the number of prefetch streams (i) 70, for page (i), is greater than a number of prefetch streams high threshold, then control proceeds to block 156 to set the page (i) write activity level 64a . . . 64n to high. Otherwise, if the conditions of block 158 to check for a high level of activity are not met, then the write activity level generation unit 16 determines (at block 160) whether the number of accesses (i) 74, for page (i), is greater than a number of accesses low threshold and number of writes (i) 72, for page (i), is greater than a write threshold percent times the number of accesses 74. If the (at block 160) medium write activity check conditions are met, then the page (i) write activity level 64a . . . 64n is set (at block 162) to medium write activity. Otherwise, if (at block 160) the medium write activity level check conditions are not meant, then the page (i) write activity level 64a . . . 64n is set (at block 164) to low write activity level. After setting the page (i) write activity level 64a . . . 64n, control proceeds to block 166 to process the next page. After calculating the write activity level for each page 64a . . . 64n control proceeds (at block 168) to block 170 in FIG. 9.

With respect to FIG. 9, the write activity level generation unit 16 or 58 determines (at block 170) a number of pages that has a high activity level, a medium activity level and low activity level. If (at block 172) the number of pages having the high write activity level exceeds a high threshold number of pages, then server write activity level is set (at block 174) to high activity level. If (at block 176) the numbers of pages that have the high and medium write activity levels exceed the medium threshold number of pages, then the server write activity level is set (at block 178) to medium activity level. Otherwise, if (at block 180) the number of pages that has the low write activity level exceeds low threshold number of pages, then the server write activity level is set (at block 182) to low. If neither of the high, medium or low activity conditions are met at blocks 172, 176, and 180, then the server write activity level is not sent (at block 184) to the storage server 18 because no change in write activity level is determined.

Figure 10:
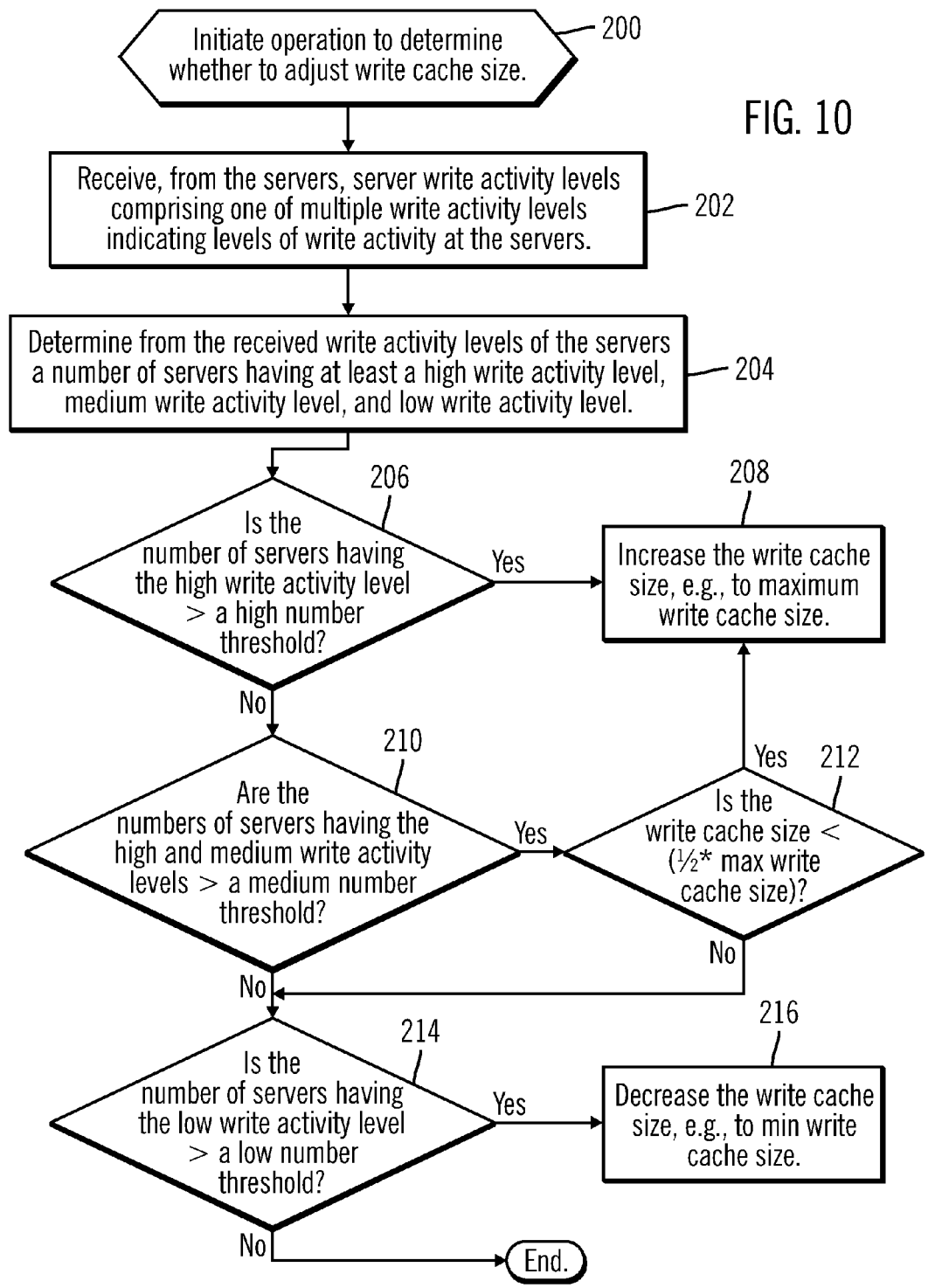
FIG. 10 illustrates an embodiment of operations for a storage server to determine whether to adjust the write cache.

FIG. 10 illustrates an embodiment of operations performed at the storage server 18 by the cache adjustment code 30 to process the server write activity levels received from the servers 2 to determine adjustments to make to the size of the write cache 32. Upon initiating (at block 200) the operation to determine whether to adjust the write cache 32 size, the cache adjustment code 30 receives (at block 202), from the servers 2, server write activity levels comprising one of multiple write activity levels indicating levels of write activity at the servers, e.g., high, medium, low. The cache adjustment code 30 determines (at block 204) from the received write activity levels of the servers 2 a number of servers having at least a high write activity level, medium write activity level, and low write activity level. If (at block 206) the number of servers having the high write activity level exceeds a high number threshold, then the cache adjustment code increases (at block 208) the write cache 32 size, e.g., by an incremental amount or to a maximum write cache 32 size. If the write cache 32 size is already at the maximum size, then there would be no change. Otherwise, if (at block 210) the number of servers having the high and medium write activity levels exceeds a medium number threshold and if (at block 212) the write cache 32 size is less than half the maximum write cache size, then control proceeds to block 208 to increase the write cache 32 size by an incremental amount or to the maximum possible size. If (at block 210) the number of servers having the medium number threshold is not met, then the cache adjustment code 30 determines (at block 214) whether the number of servers having the low write activity level exceeds a low number threshold. If so, then the cache adjustment code 30 decreases (at block 216) the write cache 32 size, such as by an incremental amount or to a minimum write cache size. If the server condition checks at blocks 206, 210, 212, and 214 are not satisfied to result in an adjustment to the write cache 32 size, then control ends.

Although embodiments are described with respect to high, medium, and low activity levels, there may be any number of additional activity levels to provide more fine grained control of the cache level adjustments. FIGS. 8 and 9 provide specific algorithms for determining how to classify the page writ activity level and the server write activity level. However, other conditions and thresholds may be used to determine the activity level for a page and the server, and there may be a different number of levels than the three, high, medium, and low and different number or thresholds described with respect to FIGS. 8 and 9.

Further, the cache adjustment code 30 may provide multiple finer adjustments to the write cache size based on the determined level of write activity across all servers than described in FIG. 10, such as by increasing or decreasing the write cache size by incremental amounts up to a minimum or maximum write cache size. Alternatively, the cache size may be adjusted to the maximum or minimum size upon determining that a high or low thresholds are satisfied. Further, different threshold checks based on the number of servers having the different write activity levels may be used to determine whether to increase or decrease the write cache 32 size.

Described embodiments provide techniques for servers 2 to provide the storage server 18 hints as to write activity at the servers 2 so that the storage server 18 may dynamically adjust the write cache size to accommodate actual write activity occurring at the servers, such as burst write activity. This allows the storage server 18 to anticipate when servers 2 are experiencing a surge of writes that may fill up the write cache 32 and cause performance degradation. Further, when write activity at the servers is low, the activity hints trigger the storage server to reduce write cache 32 size without a negative impact on server 2 performance. This allows the storage server to optimize the write cache size based on actual or estimated activity at the servers. Some resulting benefits of allowing dynamic adjustment based on server write activity may include fewer spikes in application response times and reduced energy use by the system overall. Further, allowing the increase in the write cache size to accommodate higher levels of write activity has a significant impact on the servers 2 performance because writes do not have to be retried, thus significantly reducing the average response time to the servers 2.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
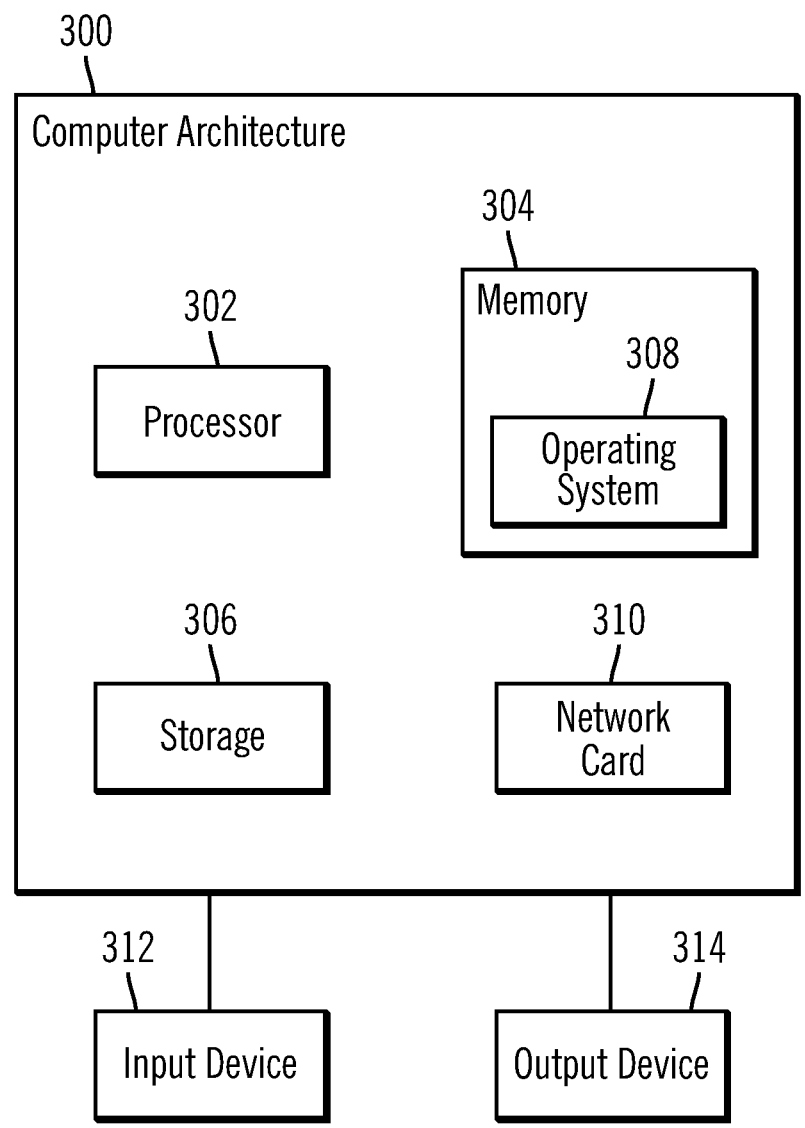
FIG. 11 illustrates an embodiment of a computer architecture.

FIG. 11 illustrates an embodiment of a computer architecture 300 that may be implemented at the servers 2 and 18 in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308 and the storage manager 10, 20, in the storage 306 are loaded into the memory 304 and executed by the processor 302. The memory 304 may further include the cache 20, 22, collision queue 30, performance metric thresholds 32, gathered metric information 28, and copy data structure 26. The architecture further includes a network card 310 to enable communication with the network 30. An input device 312 is used to provide user input to the processor 302, and may include a keyboard, mouse, pen-stylus, microphone, touch sensitive display screen, or any other activation or input mechanism known in the art. An output device 314 is capable of rendering information transmitted from the processor 302, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6-10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product comprising a non-transitory computer readable storage medium implementing code for indicating a server write activity level for a server in communication with a storage server having a write cache, wherein the code executes to perform operations, the operations comprising:
    gathering server write activity information on server write activity to a cache;
    processing the server write activity information to determine a server write activity level comprising one of multiple write activity levels indicating a level of write activity; and
    transmitting the determined server write activity level to the storage server, wherein the storage server uses the determined server write activity level to determine whether to adjust a size of the storage server write cache.

2. The computer program product of claim 1, wherein the server write activity information includes a number of writes to pages and a number of accesses to pages, wherein the processing the server write activity information comprises comparing a calculation based on the number of writes and the number of accesses to at least one threshold to determine the server write activity level.

3. The computer program product of claim 2, wherein the server write activity information further includes a number of prefetch streams to the pages, wherein the processing the server write activity information comprises comparing a calculation based on the number of writes, the number of accesses and the number of prefetch streams to at least one threshold for the pages to determine the server write activity level.

4. The computer program product of claim 3, wherein the processing the server write activity information further comprises performing for each page for which a page write activity level is calculated:
    setting the page write activity level for the pages to high write activity in response to determining that the number of accesses for the page exceeds a number of accesses high threshold and a number of writes for the page exceeds a write threshold percent times the gathered number of accesses for the page or in response to determining that the gathered number of writes for the page is greater than a number of writes low threshold and the gathered number of prefetch streams for the page is greater than a number of prefetch streams high threshold;
    setting the page write activity level to medium write activity in response to determining that the gathered number of accesses for the page is greater than a number of accesses low threshold and the gathered number of writes for the page is greater than the write threshold percent times the gathered number of accesses for the page; and
    setting the page write level activity to low write activity level in response to determining not to set the write activity level to the high or medium write activity levels.

5. The computer program product of claim 4, wherein the operations further comprise:
    setting the server write activity level to high in response to determining that the number of pages that has the high write activity level exceeds a high threshold number of pages;
    setting the server write activity level to medium in response to determining not to set the server write activity level to high and in response to determining that the number of pages having the high and medium write activity levels exceeds a medium threshold number of pages; and
    setting the server write activity to low in response to determining that the number of pages having the low activity level exceeds a low threshold number of pages.

6. A computer program product comprising a non-transitory computer readable storage medium implementing code for adjusting a write cache for a storage server in communication with a plurality of servers, wherein the code executes to perform operations, the operations comprising:
    receiving, from the servers, server write activity levels comprising one of multiple write activity levels indicating levels of write activity at the servers;
    processing the server write activity levels of the servers to determine whether to adjust a size of the write cache for receiving writes from the servers; and
    adjusting the size of the write cache in response to determining to adjust the size of the write cache.

7. The computer program product of claim 6, wherein processing the server write activity levels comprises:
    determining from the received server write activity levels, a number of servers having at least a high write activity level, medium write activity level, and low write activity level; and
    determining whether to increase or decrease the write cache size based on whether the number of servers having the high, medium, and low server write activity levels exceeds at least one threshold.

8. The computer program product of claim 7, wherein determining whether to increase or decrease the write cache size comprises:
increasing the write cache size in response to determining that the number of servers having the high write activity level exceeds a high number threshold;
increasing the write cache size in response to determining that the number of servers having the high write activity level and the medium write activity level exceeds a medium number threshold and a current write cache size is less than a maximum write cache size; and
decreasing the write cache size in response to determining that the number of servers having the low write activity level exceeds a low number threshold.

9. The computer program product of claim 6, wherein the processing of the write activity levels of the servers comprises:
using recently received server write activity levels and previously received write activity levels for servers not providing a recent server write activity level to process the server write activity levels to determine whether to adjust the size of the write cache.

10. A system in communication with a storage server having a write cache, comprising:
a cache;
a code module executing code to perform operations, the operations comprising:
gathering server write activity information on server write activity to the cache;
processing the server write activity information to determine a server write activity level comprising one of multiple write activity levels indicating a level of write activity; and
transmitting the determined server write activity level to the storage server, wherein the storage server uses the determined server write activity level to determine whether to adjust a size of the storage server write cache.

11. The system of claim 10, wherein the server write activity information includes a number of writes to pages and a number of accesses to pages, wherein the processing the server write activity information comprises comparing a calculation based on the number of writes and the number of accesses to at least one threshold to determine the server write activity level.

12. The system of claim 11, wherein the server write activity information further includes a number of prefetch streams to the pages, wherein the processing the server write activity information comprises comparing a calculation based on the number of writes, the number of accesses and the number of prefetch streams to at least one threshold for the pages to determine the server write activity level.

13. The system of claim 12, wherein processing the server write activity information further comprises performing for each page for which a page write activity level is calculated:
setting the page write activity level for the pages to high write activity in response to determining that the number of accesses for the page exceeds a number of accesses high threshold and a number of writes for the page exceeds a write threshold percent times the gathered number of accesses for the page or in response to determining that the gathered number of writes for the page is greater than a number of writes low threshold and the gathered number of prefetch streams for the page is greater than a number of prefetch streams high threshold;
setting the page write activity level to medium write activity in response to determining that the gathered number of accesses for the page is greater than a number of accesses low threshold and the gathered number of writes for the page is greater than the write threshold percent times the gathered number of accesses for the page; and
setting the page write level activity to low write activity level in response to determining not to set the write activity level to the high or medium write activity levels.

14. A system in communication with a plurality of servers, comprising:
a write cache for caching writes from the servers;
a code module executing code to perform operations, the operations comprising:
receiving, from the servers, server write activity levels comprising one of multiple write activity levels indicating levels of write activity at the servers;
processing the server write activity levels of the servers to determine whether to adjust a size of the write cache for receiving writes from the servers; and
adjusting the size of the write cache in response to determining to adjust the size of the write cache.

15. The system of claim 14, wherein processing the server write activity levels comprises:
determining from the received server write activity levels a number of servers having at least a high write activity level, medium write activity level, and low write activity level; and
determining whether to increase or decrease the write cache size based on whether the number of servers having the high, medium, and low server write activity levels exceeds at least one threshold.

16. A method, comprising:
gathering server write activity information on server write activity to a cache;
processing the server write activity information to determine a server write activity level comprising one of multiple write activity levels indicating a level of write activity; and
transmitting the determined server write activity level to a storage server having a write cache, wherein the storage server uses the determined server write activity level to determine whether to adjust a size of the storage server write cache.

17. The method of claim 16, wherein the gathered write activity information includes a number of writes to pages and a number of accesses to pages, wherein processing the gathered information comprises comparing a calculation based on the number of writes and the number of accesses to at least one threshold to determine the server write activity level.

18. A method, comprising:
receiving, from servers, server write activity levels comprising one of multiple write activity levels indicating levels of write activity at the servers;
processing the server write activity levels of the servers to determine whether to adjust a size of a write cache for receiving writes from the servers; and
adjusting the size of the write cache in response to determining to adjust the size of the write cache.

19. The method of claim 18, wherein processing the server write activity levels comprising:
determining from the received server write activity levels of a number of servers having at least a high write activity level, medium write activity level, and low write activity level; and determining whether to increase or decrease the write cache size based on whether the number of servers having the high, medium, and low server write activity levels exceeds at least one threshold.

20. The method of claim 18, further comprising:

setting the server write activity level to high in response to determining that the number of pages that has the high write activity level exceeds a high threshold number of pages;

setting the server write activity level to medium in response to determining not to set the server write activity level to high and in response to determining that the number of pages having the high and medium write activity levels exceeds a medium threshold number of pages; and setting the server write activity to low in response to determining that the number of pages having the low activity level exceeds a low threshold number of pages.

* * * * *